United States Patent
Ferrucci et al.

[11] 3,917,501
[45] Nov. 4, 1975

[54] NON-WOVEN FABRIC-LIKE RUBBERY MATERIAL AND PROCESS OF MANUFACTURE

[75] Inventors: Lorenzo A. Ferrucci, North Haven; Whitney J. R. Hauser, Guilford, both of Conn.

[73] Assignee: Yaleco Industries, Inc., Guilford, Conn.

[22] Filed: July 27, 1973

[21] Appl. No.: 383,265

[52] U.S. Cl. ............... 156/279; 260/3; 260/17; 260/17.4; 260/747; 260/750; 260/751; 260/873; 260/887; 260/889; 264/131; 427/180; 427/390; 428/90; 428/297; 428/303; 428/323; 428/402

[51] Int. Cl.² ......................................... B01D 21/00

[58] Field of Search ........... 161/239, 242, 244, 151, 161/158, 168, 64, 162, 164, 170, 172, 180; 117/16, 20, 21, 28, 29; 260/3, 750, 747, 751, 17.4, 17, 873, 887, 889; 156/279; 264/131, 134

[56] References Cited
UNITED STATES PATENTS

| | | | |
|---|---|---|---|
| 2,039,529 | 5/1936 | Guinzburg | 260/750 |
| 2,494,806 | 1/1950 | Gibson | 260/750 |
| 3,436,442 | 4/1969 | Saks | 156/279 |

*Primary Examiner*—George F. Lesmes
*Assistant Examiner*—James J. Bell
*Attorney, Agent, or Firm*—DeLio and Montgomery

[57] ABSTRACT

A non-woven, fabric-like material is produced by forming a blend of uncured natural or synthetic rubber, natural or synthetic powdery fibers, and curing agents, calendering the blend to form a sheet, distributing the powdery fibers over at least one surface of the sheet while the sheet is at an elevated temperature so as to adhere the fibers to the surface, and curing. The amount of powdery fibers in and on the sheet is such as to impart the feel of fabric to the sheet without substantially reducing the flexibility and strength of the rubber in the sheet.

7 Claims, 1 Drawing Figure

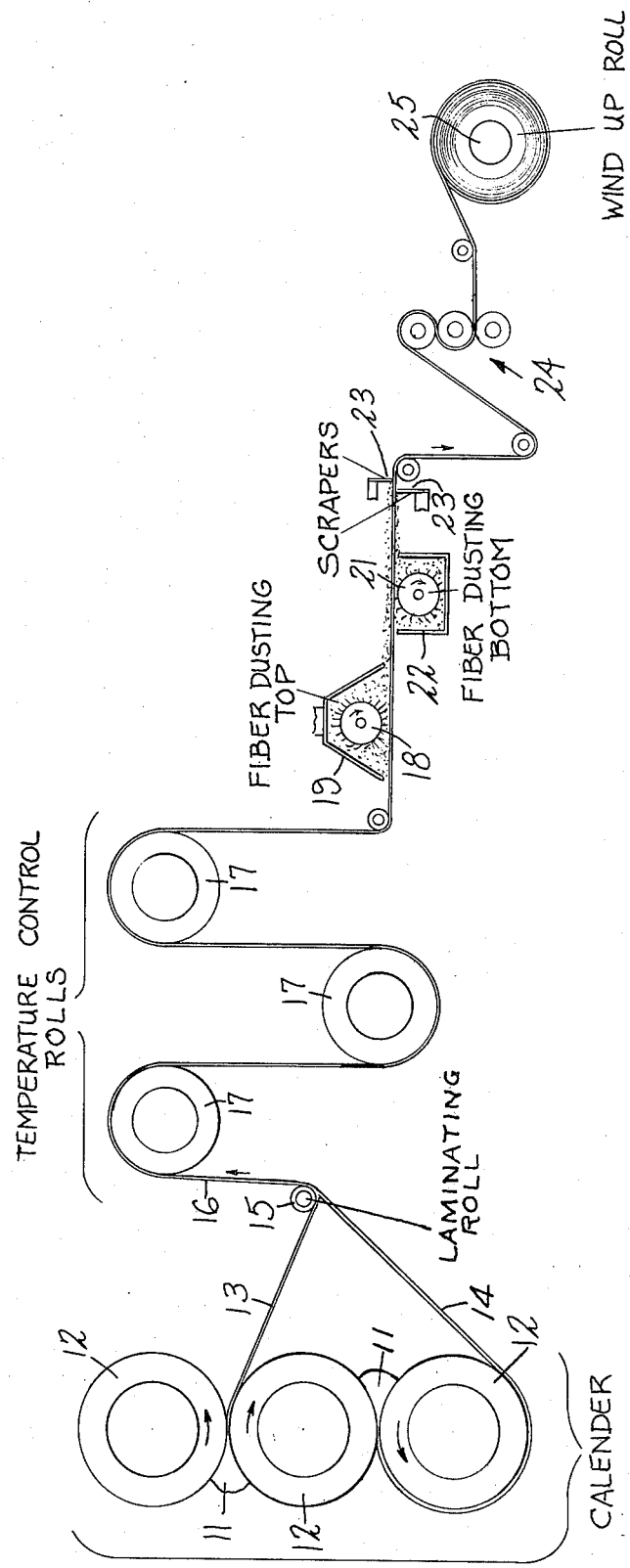

NON-WOVEN FABRIC-LIKE RUBBERY MATERIAL AND PROCESS OF MANUFACTURE

BACKGROUND OF THE INVENTION

This invention relates to non-woven, fabric-like sheeted materials, and processes of manufacture thereof. More particularly, the invention relates to non-woven, fabric-like materials which combine the properties of sheeted rubber and fibrous materials so as to provide a fabric-like feel to the sheeted rubber.

In the field of non-woven, sheeted materials there have been developed felts, battings, textiles, and paper-like materials, some of which involve the combination of fibers and elastomeric materials such as rubber latex. The latter materials are generally produced by forming webs of the fibers, bonding a rubber latex to the web, and then finishing, as by curing, resaturation, dyeing, printing, and the like. In some cases the finished products are porous to air only, porous to air and moisture, or substantially non-porous to air and moisture. However, even though such materials combine fibers with elastomers, the resulting products are not fabrics because they lack the fabric-feel which results only from the presence of exposed fibers, and especially fiber ends, uniformly distributed over one or both surfaces of the sheet.

To supply fabric-feel while retaining the properties of the elastomer, including substantial non-porosity to air and moisture, sheeted rubbery material has been adhered or laminated to a sheet of supporting fabric, usually on only one side of the sheeted rubbery material. Such products do impart fabric-feel but at the expense of much of the elastomeric properties of the sheeted rubbery material. In products in which the sheeted rubbery material is supported on both sides with a fabric layer, the elastomeric properties are lost to an even greater extent.

In recent years synthetic elastomeric fibers, known as "spandex" fibers, have been developed for the purpose of combining the properties of elastomers and fibers. Although such fibers have found widespread acceptance in the manufacture of woven or knitted textile, as in swimwear, foundation garments, and support hosiery, the manufacture of textiles with spandex is complex, and spandex normally is not used alone but in combination with other fibers and fabrics. These and other fibers have been used in the manufacture of braided and woven tapes, but at considerable expense.

There is a need, therefore, for a sheeted material which combines the properties of rubber and fabric but without substantial diminution of the properties of either, and which can be manufactured economically to suit a wide variety of applications.

OBJECTS AND SUMMARY

Accordingly, an object of the invention is to provide new and improved non-woven, sheeted material which combines the properties of sheeted rubbery materials and fabrics so that the resulting material has "fabric-feel" and retains the properties of the rubbery material such as flexibility, suppleness, extensibility and substantial non-porosity.

Another object is to provide a new and improved process for manufacturing non-woven fabric-like rubbery sheeted material which avoids the complexities of web-formation and impregnation of a web, or the need to combine a rubbery sheeted material with a supporting fabric.

Still another object of the invention is to provide a new and improved non-woven fabric-like rubbery sheeted material, and process of manufacture thereof, involving the use of readily available and inexpensive materials, and simple manufacturing steps.

These and other objects, features and advantages of the invention will be apparent from the specification which follows.

In summary outline, the non-woven fabric-like material of the invention is a flexible, substantially non-porous sheet of cured natural or synthetic rubber having uniformly distributed throughout the body and over at least one surface thereof, an amount of powdery natural or synthetic fibers effective to impart the feel of fabric to the sheet but without substantial loss of the flexibility and strength which the rubber would have if the rubber had been cured without combination with the fibers.

The use of well known equipment, such as rubber compounding and calendering machines, are employed for carrying out the process according to the invention. The essential steps of the process are: (a) the formation of a uniform blend of uncured, natural or synthetic rubber, natural or synthetic powdery fibers, and one or more curing agents; (b) calendering of the blen to form a uniform, flexible, substantially non-porous sheet; (c) distributing additional powdery fibers over at least one surface of the sheet while the sheet is at an elevated temperature, so as to adhere the fibers to the surface; and (d) curing the resulting product.

The cured non-woven, fabric-like rubbery sheeted material of the invention is useful in any product where the combination of the properties of fabric-feel and sheeted rubbery material is important. As wearing apparel, such uses include aprons, bibs, swimwear, bathing caps, shower caps, diapers and lining of various types of clothing. As home furnishings the sheeted materials of the invention are useful in bed sheeting, shower curtains and table cloths. Industrial uses include backings and insulation. In the medical and sanitary field, the products are useful as bed pads and sheeting, and as covers of miscellaneous types. The sheeted materials of the invention can be cleaned utilizing appropriate techniques and also by vacuum cleaning. Moreover, depending upon the proportion of fibers in and on the rubbery sheeted material, the products retain the extensibility, tensile strength, and other properties of the rubber, which properties can be tailored to ultimate uses in accordance with known rubber technology.

The invention accordingly comprises an article of manufacture possessing features, properties, and relation of elements, as well as a process comprising several steps and the relation of one or more of such steps with respect to each of the others, each of which aspects will be exemplified in the specification following, and the scope of the invention will be indicated in the claims.

DETAILED DESCRIPTION

The accompanying drawing, which schematically depicts certain steps and devices utilized in the manufacturing process of the invention, will contribute to a fuller understanding of the nature and objects of the invention.

In the first step of the process, a uniform blend of uncured, normally solid natural or synthetic rubber, natural or synthetic powdery fibers, and one or more curing agents is formed. Any suitable mixing or blending device may be used for this purpose, such as a rubber mill, a Banbury mixer, or the like. The mixing must be such as to intimately and uniformly distribute the fibers throughout the body of the rubber. The formation of the uniform blend in some instances may be effected in a single step but preferably a uniform mixture of the rubber and the fibers is prepared first and the mixture is then aged for a suitable period of time before the blending in of the curing agents. As is well known in the art of manufacturing rubber sheeting, if a blend of rubber and curing agents is calendered too soon after blending, the sheeted product will unduly shrink and contract. It is therefore preferred to form the blend of rubber and fibers, allow the blend to age for about 24 hours, and thereafter if necessary grind or otherwise break up the mixture, add the curing agents, reblend, and then calender.

With reference to the drawing, the blend 11 of rubber, fibers and curing agents is then admitted between the rolls 12 of a calendering machine. The blended material may be calendered to a single sheet or ply but preferably at least two plies are formed so that if pin holes should occur in one of the plies, the other ply normally will cover the pin holes. In this manner from two plies 13 and 14, for example, may be formed by suitable positioning of a laminating roll 15, a multi-ply sheeted material 16. The final sheet may range in thickness from about 4 mils for a single ply sheet to 20 mils or higher for multi-ply sheets.

The additional powdery fibers are then distributed over one or both surfaces of the calendered material 16. For this purpose the surfaces of the calendered material should be at an elevated temperature so that the surfaces will be softened and the fibers will more readily adhere to the surfaces. In most cases, by virtue of heat generated during the blending and calendering, the sheeted material will already be at a sufficiently high temperature as it leaves the calender and therefore one or both surfaces can be immediately contacted with the fibers. In other cases, as in the formation of a multi-ply sheet such as illustrated in the drawing, the somewhat more complex calendering will result in a sheet whose surfaces have cooled so that the fibers will not readily adhere. Accordingly, in the case of forming multi-ply sheets, it is preferred to employ one or more temperature control rolls 17 intermediate the calender and fiber application stations.

Rolls 17 control the temperature of the sheet 16, either by permitting the sheet to cool to the required fiber application temperature or by heating the sheet to the required temperature. Such cooling and/or heating rolls are well known in the calendering art. The sheet temperatures for best adherence of the fibers will depend on the type of rubber and the type of fibers utilized. For example, natural fibers such as cotton and wool are more "fuzzy" than synthetic fibers and therefore tend to anchor to the surface of the rubber sheet more readily than do synthetic fibers. Accordingly, the surface of the rubber sheet usually will not need to be heated and softened to the extent required when synthetic fibers are applied. Generally, however, the temperature need be no higher than required to soften the surface of the sheet so that the fibers will adhere. About 90°F. to about 200°F. is a suitable range.

In association with the calendering and temperature control rolls there may be used various known bridle systems and rolls for the purpose of controlling the speed of the sheet and for stretching or otherwise dimensioning the sheet in a manner well known in the art. Such auxiliary rolls therefore are not shown in the drawing.

The fibers are then uniformly applied to or "dusted" onto one or both surfaces of sheet 16. Any suitable means or device may be employed for this purpose and the fibers also can be manually distributed on one or both surfaces of the sheet. However, for uniform distribution and metering of the proper quantity of fibers to the surfaces of the sheet, it is preferred to brush the fibers onto the surface, for example, by the use of a rotating drum 18 having brushes thereon and arranged within a bin 19. The bin 19 is open at the bottom, adjacent the surface to which the fibers are to be applied, and permits application of the fibers in measured quantities. By controlling the speed at which the sheet 16 passes under the rotating drum 18, as well as the speed of rotation of the drum, the fibers can be uniformly distributed over the surface of sheet 16.

It is preferred to apply the fibers to both surfaces of the sheet and therefore a second rotating drum 21 having brushes thereon is located in a suitable metering bin 22 having an opening adjacent the opposite surface of sheet 16, as shown in the drawing. Bin 22 may be arranged for dispersing of the fibers by gravity on the opposing sheet surface by forming an S-loop of the traveling sheet, with fiber bin 22 arranged above the mid-bar of the S (not shown), such arrangements being well known in the calendering art.

Removal of non-adherent fibers and control of distribution of the fibers to obtain uniformity of adherence may be further controlled by doctoring or scraping devices such as the scrapers 23, in a manner well known in the calendering art. The fibers thus removed may be conveyed back to the metering bins 19 and 22 if desired. Other auxiliary equipment may be utilized, if desired. For example, if optimum velvety character is desired, an electrostatic device may be positioned at any suitable point along the moving sheet 16 in order to promote "stand-up" of the fibers on the sheet.

The sheeted rubbery material containing the fibers in the body thereof as well as on one or more of the surfaces thereof is then cured under conditions known in the art of rubber curing. Generally, an elevated temperature is required, of the order of about 260°F. to about 330°F. over about 6 to about 10 hours. Curing time and temperature will depend upon the type of rubber and fiber used, the dimensions of the rubbery sheet and the curing agents compounded with the rubber. The fiber in and on the rubbery sheet normally will not substantially affect such curing conditions, so that the recommendations of the rubber manufacturer and the curing agents manufacturer generally may be followed. Curing may be effected while the sheet 16 moves through conventional guide rolls 24 to a wind-up roll 25 or by other appropriate techniques, including bulk curing. Generally, it is preferred to pass the moving sheet 16 through a curing oven prior to wind-up.

The resulting cured sheet may then be cut in any manner desired to obtain dimensions for a useful product. It will also be evident that the width of the sheet may be suitably controlled by choice of width of calendering rolls and like considerations, all of which are well known in the calendering art.

Any form of normally solid rubber, natural or synthetic, may be used in manufacturing the products of the invention, although for certain ultimate uses certain types of rubber will be preferred over others. The natural rubbers include wild or plantation grown rubbers, such as Hevea Braziliensis, Castilloa, Ceara, Guayule, Ficus Elastica, Funtumia, Landolphia, and the like. Among the synthetic rubbers, there may be mentioned the hydrocarbon rubbers, such as polyisoprene and polybutadiene, copolymers of dienes and hydrocarbons, and amorphous olefins. Certain of the foregoing classes of synthetic rubbers are more familiarily known by other names, such as butyl rubber, neoprene rubber, SBR rubber, EPDM (diene-modified ethylene propylene) rubber, nitrile rubber, alfin rubber, acrylate rubber, polychloroprene rubber, and others.

Similarly, a wide variety of curing agents and systems are well known, the specific nature thereof depending upon the type of rubber. While sulphur is the most common curing agent, such curing systems may involve the use of sulphur substitutes, alone or in combination with auxiliary agents such as accelerators, activators, and the like. In addition, it is conventional to compound the rubber, usually at the same time it is compounded with curing agents, with fillers and pigments, such as carbon black, clay, titanium dioxide, silica, and the like, for control of certain cure or ultimate properties, such as Mooney viscosity, scorch resistance, tensile strength, elongation, modulus, and hardness. The particular types of curing agents and other additives are not critical to practice of the invention and can be varied according to the specifications of the rubber manufacturer and additives manufacturer. It will therefore suffice to refer to the prior art on this subject, such as U.S. Pat. Nos. 2,500,517, 3,288,763, 3,370,051, 3,459,689, 3,531,444 and 3,644,304, among the numerous patents which could be mentioned.

The fibers to be incorporated into and on the rubber also may be natural or synthetic, although experience to date has indicated that the natural fibers are preferred because their more "fuzzy" character enables them to become more securely anchored to the surface of the rubber. Fibers previously treated with dyes and other agents also can be utilized, although fibers dyed with copper compounds should be avoided due to a tendency of such compounds to cause deterioration of the final product. Among the natural fibers may be mentioned cotton, wool and silk. The synthetic fibers include nylon, rayon, polyester, acetate, acrylic, modacrylic, olefin and others, such as the synthetic fibers defined in Section 7 (c) of Rules and Regulations of the Federal Trade Commission under the Textile Fiber Products Identification Act. Low denier fibers are preferred of the order of about 1–10 denier. The fibers, as well as the rubbers, may be used either singly or in combinations of two or more of any of the types, whether natural or synthetic, or natural types can be combined with synthetic types.

The fibers should be in an essentially powdery state so that they will tend to stand up on the surface of the rubber sheeting and impart a fabric-like feel to the sheeting, generally of the character of ultra-fine and soft velvet. By "powdery" is meant the condition of a finely divided state and small fiber dimensions (diameter and length), achieved in any suitable fashion, as by cutting or grinding of fibers of greater length, so that the fiber will impart the required fabric-like feel. If the fibers are too large, or are used in too great amounts, the rubbery characteristics of the resulting product, such as extensibility and strength, will be lessened too greatly. Moreover, longer fibers tend to cause pin holes in the sheeted product, thus lowering strength and causing porosity. If the fibers are too small, or are not used in sufficient amounts, there will be insufficient fabric feel to the product. Experience to date generally indicates that the more useful fibers for the purposes of the invention are those having lengths averaging from about 0.004 mm. to about 1.5 mm., and diameters averaging from about 2 microns to about 40 microns. The preferred fibers are those of lengths less than 1.0 mm., for example, from about 0.006 mm. to about 0.78 mm., and diameters of from about 4 microns to about 31 microns. However, some fibers may be more inherently soft than others and therefore their lengths and diameters may range higher. Amassed or flocked fibers are also useful if the fibers can separate sufficiently for good distribution in and on the rubbery material.

The amounts of fibers in and on the rubbery sheet of the invention, as indicated by experience to date, will be from about 0.5% to about 10% by weight of the finished product. Under 0.5% by weight experience indicates that fabric feel falls off to an undesirable degree and over 10% by weight, the elasticity of the final product tends to decrease too greatly. Experience to date has shown that preferred amounts of the fiber are from about 1% to about 5% by weight of the final product. Products containing fiber near the higher limits may be utilized where fabric-like character has more significance than the rubbery character of the product.

The rubbery sheets of the invention should have sufficient strength and elasticity for usefulness. Experience to date indicates that for most end uses the products should exhibit an elongation at break of between about 500% and about 900% and a tensile strength at break no lower than about 1,000 psi. Values outside these ranges greatly limit the range of usefulness. For example, under 500% elongation, the product would break too easily and too soon since it would be relatively stiff and inelastic. Over 900% elongation, the product would be too soft and too elastic for many uses. Under 1,000 psi tensile strength the product would have too little strength for long term use.

The following example illustrates a formulation useful in producing rubbery sheeted products of the invention.

EXAMPLE

A blend was prepared having the following formulation:

| | Parts by Weight |
|---|---|
| Natural rubber | 100.00 |
| ZnO | 5.00 |
| Antioxidant | 0.50 |
| TiO$_2$ | 12.34 |
| Stearic acid | 1.00 |
| CaCO$_3$ | 33.75 |
| Cotton fibers | 1.12 |
| Accelerators | 1.875 |
| Sulphur | 2.25 |

The cotton fibers had an average length of 0.0211 mm. and an average diameter of 15.38 microns. The antioxidant was a phenolic compound sold by American Cyanamid Company as Antioxidant 2246 and the accelerating agents were compounds sold by the same company under the designations MBT, MBTS, and DETU.

After blending and dusting of the fibers onto both surfaces of the sheeted rubber essentially as described with reference to the drawing, the product was cured at 280°F. for 9 hours. The resulting sheeted product was supple and elastomeric, and exhibited an elongation at break of 675% to 750% and a tensile strength at break of 1400 to 2900 psi (9.7 to 20.0 MN/m$^2$). The product had a soft, velvety feel and could easily be cut as desired.

In view of the foregoing description it will be apparent that the invention is not limited to the specific details set forth therein for the purposes of illustration, and that various other modifications are equivalent for the stated and illustrated functions without departing from the spirit and scope of the invention.

What is claimed is:

1. A process for producing a non-woven, fabric-like material, comprising:
    a. forming a uniform blend of uncured natural or synthetic rubber, natural or synthetic powdery fibers having lengths averaging from about 0.004mm. to about 1.5mm., and diameters averaging from about 2 microns to about 40 microns and one or more curing agents;
    b. calendering said blend to form a uniform, flexible, substantially non-porous sheet;
    c. distributing additional natural or synthetic powdery fibers over at least one surface of said sheet while said sheet is at an elevated temperature so as to adhere said fibers to said surface; and
    d. curing said sheet;
   the total amount of said fibers being from about 0.5% to about 10% by weight of the material and the blended and added powdery fibers being effective to impart the feel of fabric to the final sheeted product without substantial loss of elasticity and strength of said rubber.

2. A process as in claim 1 wherein, prior to step (b), an admixture of said rubber and said fibers is formed and said admixture is aged.

3. A process as in claim 1 wherein, in step (c), said fibers are distributed over both surfaces of said sheet.

4. A process as in claim 1 wherein said rubber is natural rubber and said fibers are natural fibers.

5. A process as in claim 4 wherein said fibers are cotton.

6. A process as in claim 1 wherein said rubber is natural rubber, and said fibers are cotton, wool, silk, nylon, rayon, polyester, acetate, acrylic, modacrylic, olefin, or blends of two or more of said fibers.

7. A process as in claim 1 wherein, in step (b), said blend is calendered to form a plurality of plies, and said plies are laminated to form a single said sheet prior to distribution of said powdery fibers thereon.

* * * * *